2 Sheets--Sheet 1.

A. H. KENNEDY.

Apparatus for Transmitting Motion.

No. 5,971. Reissued July 14, 1874.

WITNESSES

Harry King

H. H. Young

Albert H. Kennedy INVENTOR

By

Wm D. Baldwin & Co Attorney

2 Sheets--Sheet 2.

A. H. KENNEDY.

Apparatus for Transmitting Motion.

No. 5,971. Reissued July 14, 1874.

WITNESSES

Harry King

H. H. Young

By

INVENTOR

Albert H. Kennedy

Wm. D. Baldwin, Jr. Attorney

UNITED STATES PATENT OFFICE.

ALBERT H. KENNEDY, OF BENZONIA, MICHIGAN, ASSIGNOR, BY MESNE ASSIGNMENTS, TO SAMUEL S. WHITE, OF PHILADELPHIA, PA.

IMPROVEMENT IN APPARATUS FOR TRANSMITTING MOTION.

Specification forming part of Letters Patent No. 59,293, dated January 30, 1866; reissue No. 2,615, dated May 14, 1867; reissue No. 5,476, dated July 1, 1873; reissue No. 5,971, dated July 14, 1874; application filed June 20, 1874.

*To all whom it may concern:*

Be it known that I, ALBERT H. KENNEDY, formerly of Brunswick, in the county of Medina and State of Ohio, but now residing at Benzonia, in the county of Benzie and State of Michigan, have invented certain new and useful Improvements in Apparatus for Transmitting Motion, of which the following is a specification:

The object of my invention is so to transmit power from a prime mover to an operating instrument that the latter may freely be moved in any direction, to enable it to operate at any desired angle relative to its driving-shaft without disturbing its connection therewith, which end I attain by interposing between a rotating power-driven shaft, from which the power is conveyed to the instrument itself, and an instrument free to move in any direction, a spiral spring or flexible shaft of coiled wire. The subject-matter claimed is hereinafter designated.

Figure 1:
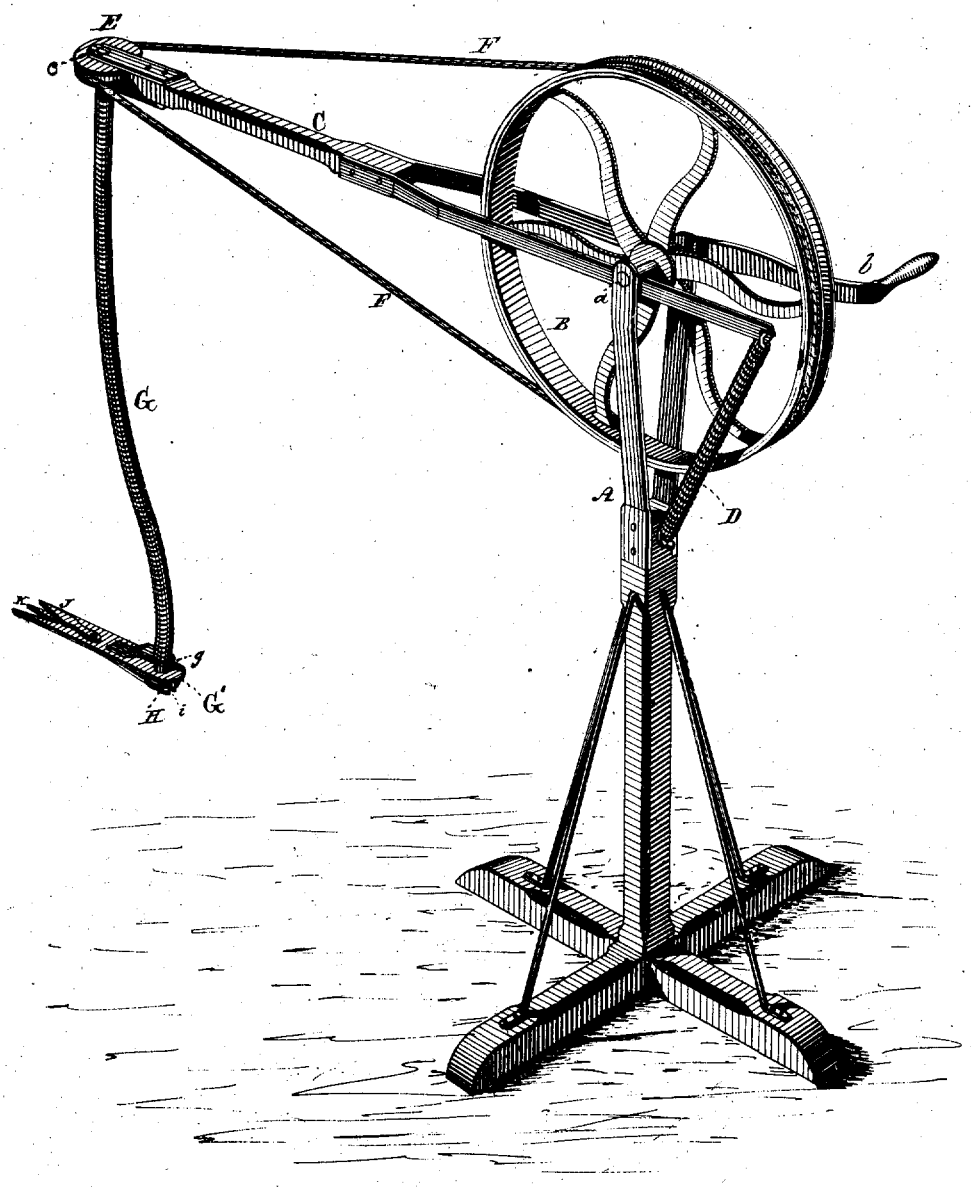
Figure 2:
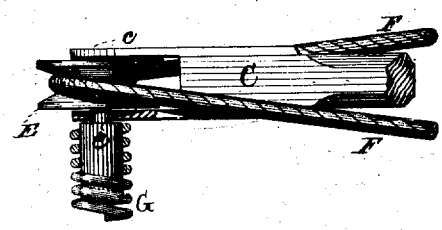
Figure 3:
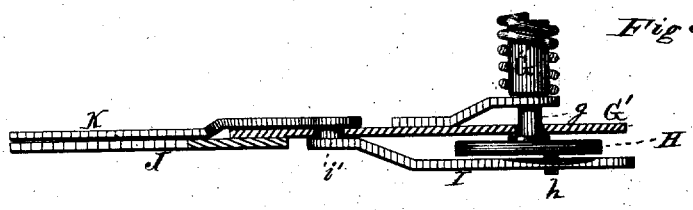
Figure 4:
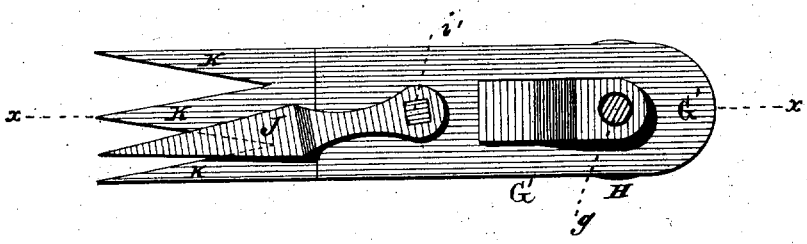
Figure 5:
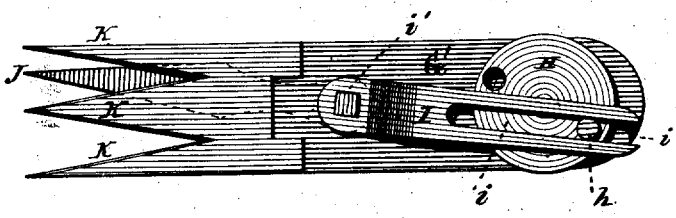

In the accompanying drawings, Figure 1 represents a view in perspective of so much of an apparatus embracing my improvements as is necessary to illustrate the invention herein claimed, the machine shown being an apparatus for shearing sheep. Fig. 2 is a detail view, partly in section, showing the connection between the flexible shaft and its driving mechanism. Fig. 3 represents a vertical longitudinal central section through the instrument on the line *x x* of Fig. 4, showing the connection between the flexible shaft and the instrument operated by it. Fig. 4 represents a top-plan view of the instrument itself, and Fig. 5 a bottom plan thereof.

A band-wheel, B, driven by a crank, *b*, or in any other equally well-known way, is mounted on a shaft, *a*, in bearing supported in a frame or stand, A. An endless band or belt, F, passes from the band-wheel B around a pulley, E, the shaft of which is mounted in bearings in an arm, C, pivoted upon the shaft *a* of the band-wheel. One end of a spiral spring, G, of steel, copper, or other metal most suitable for the purpose, is connected with the shaft or journal *c* of the pulley E. To the other end of this spring is attached a stub, *g*, through which motion may be imparted to the instrument or tool to be actuated. The stub *g*, in this instance, turns in bearings in a hand-piece or casing, $G^1$, and has a crank-wheel, H, mounted upon it. A crank-pin, *h*, on this wheel works in the slot *i* of a tail-piece or rocking lever, I, which is oscillated on a pivot, *i'*, by the rotation of the crank-pin. A vibrating cutter, J, is secured on this pivot, and is caused by its oscillations to shear over a series of fixed guards or knives, K, on the casing.

By the method of construction above described, the operator is enabled to move the instrument in all directions with the greatest facility.

The stand upon which the mechanism is mounted, it will be observed, is portable, and has a comparatively wide base, to prevent its toppling over. The upper end of the stand is forked, so as to include the band-wheel, and support its shaft at both ends. The pulley-arm C is also forked, and connected with the stand on each side of the band-wheel, in order that the arm may be more firmly braced, and to avoid unequal strain on one side of the bearing of the shaft *a*. The end of the arm C opposite to that which carries the pulley E extends beyond the shaft *a*, and is connected with the frame by a spring, D, by which means the pulley-arm and its attachments are counterbalanced and held at the elevation desired, while the arm is left free to rock on its pivot *a*, so as to be capable of being moved up or down by the operator. That end of the spiral spring or coiled-wire shaft to which the instrument is secured, being free, can be moved by the operator in any direction desired without interruption to the transmission of the driving motion.

I do not broadly claim transmitting motion through a jointed or flexible shaft, such method of transmission being well known in the arts. Neither do I claim herein the details of the shears, or the combination of the driving mechanism with said shears, as this feature forms the subject-matter of another division of my original patent, and is numbered reissue No. 5,477, dated July 1, 1873.

What I do claim as of my own invention is—

1. The combination of a rotating power-driven shaft, a flexible coiled-wire shaft, connected at one end with the power-driven shaft, suspended freely therefrom, and having secured to its other end an instrument free to be moved by hand in any direction without interrupting the transmission of the power thereto, these members being constructed to operate in combination, substantially as set forth.

2. The combination of a portable stand, a rotating power-driven shaft mounted therein, and a flexible coiled-wire shaft, connected at one end with the power-driven shaft, and at the other with an instrument free to be moved in any direction by the hand of the operator without interrupting the transmission of the power, these members being constructed to operate in combination, substantially as set forth.

3. The combination of a portable stand, an arm pivoted upon the shaft of a band-wheel, a pulley mounted upon said arm, and a flexible coiled-wire shaft, connected at one end with the pulley-shaft, and at the other with an instrument free to be moved in any direction by the operator, these members being constructed to operate in combination, substantially as set forth.

4. The combination of a rocking arm, a power-driven shaft mounted therein, a flexible shaft connected therewith for transmitting power, and a counter-balance to uphold said arm, these members being constructed to operate in combination, substantially as set forth.

5. The combination of the following elements: A portable stand, a band-wheel and pulley mounted therein, belt-connections, a flexible coiled-wire shaft freely suspended from the pulley-shaft, and an instrument controlled by the operator and driven by power transmitted through said flexible shaft, these members being constructed to operate in combination, substantially as set forth.

6. The combination of a forked stand, a forked arm pivoted therein, a band-wheel included within said arms, a pulley and flexible shaft on one end of said arm, a belt-connection between the band-wheel and pulley, and a counterbalance-spring on the other end of said arm, these members being constructed to operate in combination, substantially as set forth.

ALBERT H. KENNEDY.

Witnesses:
CLARA E. BAILEY,
W. H. MACK.